F. C. BOWEN.
Artificial Trees and Flowers.
No. 206,387. Patented July 30, 1878.
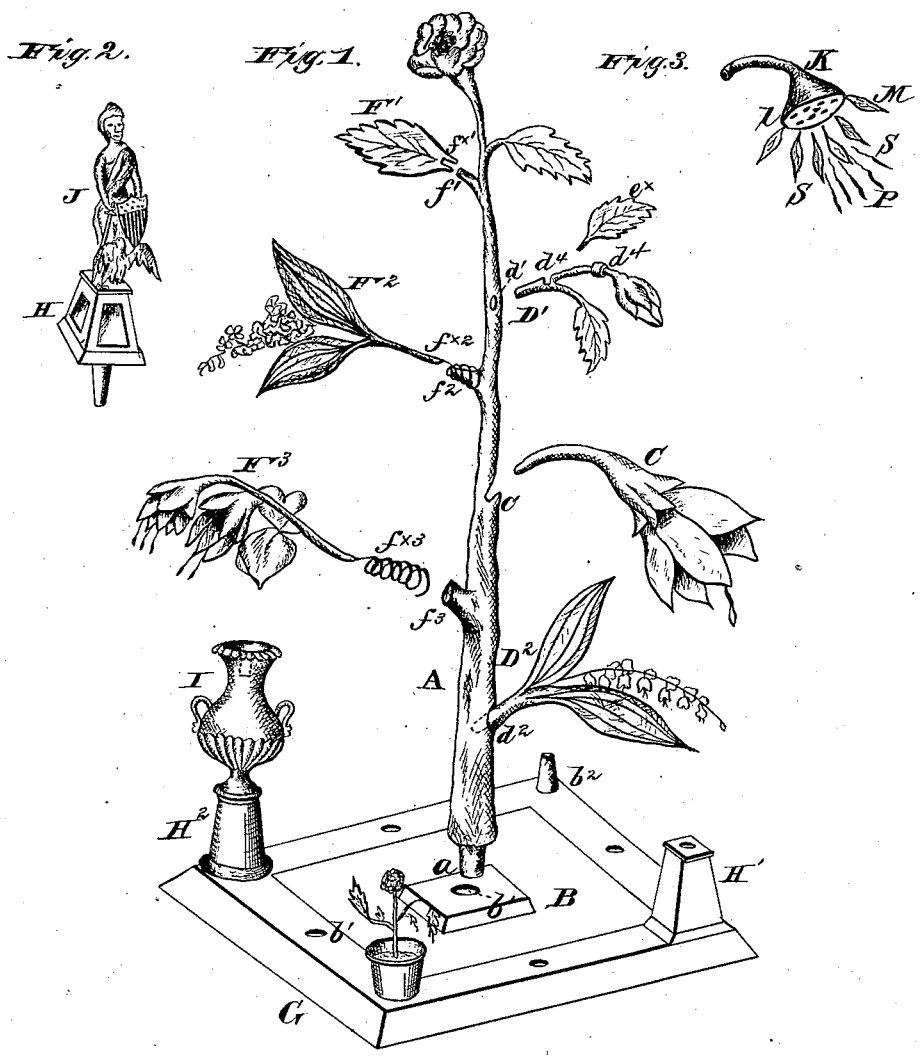
WITNESSES
Franck L. Ourand
W. B. Hale
INVENTOR
Francis C. Bowen

UNITED STATES PATENT OFFICE.

FRANCIS C. BOWEN, OF BROOKLYN, NEW YORK.

IMPROVEMENT IN ARTIFICIAL TREES AND FLOWERS.

Specification forming part of Letters Patent No. 206,387, dated July 30, 1878; application filed January 7, 1878.

*To all whom it may concern:*

Be it known that I, FRANCIS C. BOWEN, of Brooklyn, in the county of Kings and State of New York, have invented certain new and useful Improvements in Artificial Trees, Shrubs, Flowers, Gardens, &c., of which the following is a specification:

My invention relates to means for artificially representing natural flowers, plants, trees, and shrubs of various kinds, and illustrating their construction and formation, and for representing flower-beds, grass-plats, and other parts of gardens, orchards, groves, lawns, parks, &c.

The invention consists essentially in a stalk or trunk made so as to represent more or less the shape and natural growth of a tree, bush, shrub, flower, or plant, and provided with means for receiving and sustaining in position flowers, twigs, boughs, leaves, blossoms, blooms, &c., whereby provision is made for representing natural flowers, plants, and trees of various kinds, by attaching to said stalk or trunk the stems, leaves, branches, &c., appropriate to the plant or tree which it is desired to represent.

The invention further consists in the combination with a stalk or trunk provided with kerfs, openings, pins, or other means for connecting with and sustaining in position twigs, boughs, flowers, or leaves, natural or artificial, of a border-frame provided with openings, pins, or other suitable means for connecting with and supporting stalks, trunks, leaves, flowers, or pots, as will more fully hereinafter appear.

In carrying out my invention I employ a stalk or trunk, which may be made artificially of any suitable material and in shape conformed to that of some natural growth, or may consist of a natural twig or branch of a shrub or tree. This stalk or trunk is prepared for the reception of twigs, flowers, leaves, blossoms, blooms, &c., by forming kerfs or holes in its surface, or by providing tangs, pins, or studs projecting therefrom, either by leaving portions of the natural branches of the stalk or by artificially forming or attaching said pins in any suitable manner. The twigs, flowers, leaves, &c., are prepared for attachment to the stalk either by trimming their stems to fit the kerfs or openings or by providing said stems with kerfs, openings, tubes, or wire extensions, or any other means to fit the pins on the stalk.

The border-frame may be made of wood, metal, papier-maché, plastic composition, or any other suitable material. It may be of circular, oval, angular, polygonal, or other suitable shape and general outline, and colored to represent either garden soil or green grass, or both; and it may have either a plane or flat surface, or may be partly raised and partly depressed, so as to represent a bed of soil surrounded by a grass border, or vice versa, or in the form of a flower-pot. The border-frame supports the stalk or trunk above described by receiving the lower end thereof in a hole or on a pin provided for the purpose. It is also provided with openings and projecting pins for receiving and holding other stalks, trunks, or the stems of flowers or plants or shrubs, or for receiving and holding ornamental or other figures, such as flower-pots, urns or vases, pedestals, figures, &c.

The stalk or trunk above described may be made to represent any desired plant, shrub, or tree by attaching thereto the appropriate flowers, leaves, twigs, boughs, branches, &c., and it need not of necessity depend on the border-frame for support, but may be placed in an ordinary flower-pot or urn or vase, and used, either alone or in connection with natural flowers or plants, for purposes of ornamentation.

The border-frame is useful, not only for receiving and supporting the stalk or trunk and the figures before referred to, but also for ornamental purposes. Any desired number of various shapes and patterns may be placed in different positions, constructed to receive stalks, trunks, or plants, and used to represent flower-beds or grass-plats or walks in a garden or lawn.

The above entire arrangement or any part of the same may be used for interior decoration, such as the ornamentation of halls, windows, flower-stands, &c., as well as for amusement and instruction.

The accompanying drawing illustrates a mode of carrying out my invention.

Figure 1 is a perspective view, showing the manner of attaching and arranging the various parts. Figs. 2 and 3 are detail views, hereinafter particularly referred to.

A represents a stalk or trunk, in shape conforming to that of some natural growth, or it may be made from a branch of a shrub or tree, and provided at its lower end with a tang or projecting pin, $a$.

B represents a border-frame, made of wood or other suitable material, and provided with a number of openings, $b^1$, and projecting pins $b^2$. The border-frame B serves as a support for the stalk or trunk A, which is attached to it by inserting the tang or pin $a$ in one of the openings $b^1$.

The stalk A is here shown as provided with a kerf, $c$, openings $d^1$ $d^2$, and projecting tangs, pins, or studs $f^1$ $f^2$ $f^3$, for the reception of twigs, leaves, flowers, &c.

The flower C has its stem flattened and tapering, for insertion in the kerf $c$.

The stems $D^1$ and $D^2$ correspond with the shape and size of the openings $d^1$ $d^2$ for insertion therein, and the stem $D^1$ is shown as provided with an opening or kerf, $d^\times$, for attaching a leaf, $e^\times$.

The leaf $F^1$ is provided with a kerf, $f^{\times 1}$, for attachment to the pin $f^1$, and the flowers $F^2$ $F^3$ are provided with spirally-curved wires $f^{\times 2}$ $f^{\times 3}$ for attachment to the pins $f^2$ $f^3$.

Tubes $d^4$ may be used for attaching flowers, leaves, &c.

The projecting pins are preferably tapering, and they may be flattened, angular, or oval, (see $f^3$,) or of any suitable shape other than perfectly round, in order to prevent the flowers and other attached portions from turning after being placed in position.

The border-frame B is here shown as quadrangular in its general outline, with the projecting pins $b^2$ at the angles, and the openings $b^1$ intermediately between them. The projecting pins $b^2$ are for the reception of ornamental or other figures, such as a flower-pot, G, or a pedestal, $H^1$ or $H^2$, having openings in their bottoms. These pedestals may be made to support other figures, such as an urn or vase, I, or a piece of statuary, J, Fig. 2, said additional figures being provided with pins for insertion in openings in the pedestals.

Fig. 3 illustrates a mode of carrying the principle of my invention to the extent of forming different kinds of flowers. K represents the calyx of a flower, M the petals, P the pistil, and S the stamens. The calyx K is provided with openings $l$, and the petals, pistils, and stamens have their stems or inner ends tapered, so as to fit in said openings. By this means the calyx K may be used as the basis or foundation of any flower to which it may be appropriate, and the character of the flower itself will be determined by the petals, &c., used in constructing it; but such mode of forming artificial flowers is not herein claimed, as it will be the subject-matter of a separate application.

This invention is not only useful as a toy for affording amusement, but may also be utilized for the purpose of imparting instruction. It may be used in botanical lectures for illustrating the structure and formation of different varieties of trees, plants, shrubs, and flowers. It may also be used in illustrating lessons on the science of gardening.

The principle on which the stems, &c., are attached to the stalk or trunk, as described herein and illustrated in the drawing, may be carried out indefinitely. The border-frames and the figures to be attached thereto may be made of different shapes and sizes, and thus various ideas, plans, and modifications in gardening may be carried out.

What I claim as new, and desire to secure by Letters Patent, is—

1. A stalk or trunk, A, provided with kerfs, openings, pins, or other suitable means of fastening, to receive and sustain in position flowers, twigs, branches, leaves, or blossoms, natural or artificial, for the purpose of representing natural plants, shrubs, or trees, substantially as and for the purpose set forth.

2. The combination, with a stalk or trunk, A, provided with kerfs, openings, pins, or other suitable means for connecting with and sustaining in position twigs, boughs, flowers, or leaves, natural or artificial, of a border-frame provided with openings, pins, or other suitable means for connecting with and supporting stalks, trunks, leaves, flowers, pots, pedestals, or figures, substantially as and for the purpose set forth.

In testimony that I claim the foregoing I have hereunto set my hand in the presence of the subscribing witnesses.

FRANCIS CLARE BOWEN.

Witnesses:
LEONARD A. GIEGERICH,
ERNEST C. WEBB.